US012558918B2

(12) United States Patent
Tsubone et al.

(10) Patent No.: US 12,558,918 B2
(45) Date of Patent: Feb. 24, 2026

(54) WHEEL UNIT

(71) Applicants: Honda Motor Co., Ltd., Tokyo (JP); NIDEC DRIVE TECHNOLOGY CORPORATION, Nagaokakyo (JP)

(72) Inventors: Taihei Tsubone, Nagaokakyo (JP); Wataru Yada, Tokyo (JP); Tomokazu Sakamoto, Tokyo (JP); Shinichiro Kobashi, Tokyo (JP)

(73) Assignees: HONDA MOTOR CO., LTD., Tokyo (JP); NIDEC DRIVE TECHNOLOGY CORPORATION, Kyoto (JP)

( * ) Notice: Subject to any disclaimer, the term of this patent is extended or adjusted under 35 U.S.C. 154(b) by 332 days.

(21) Appl. No.: 18/372,928

(22) Filed: Sep. 26, 2023

(65) Prior Publication Data

US 2024/0109366 A1 Apr. 4, 2024

(30) Foreign Application Priority Data

Sep. 30, 2022 (JP) ................................. 2022-157695

(51) Int. Cl.
| | |
|---|---|
| B60B 19/12 | (2006.01) |
| B60B 19/00 | (2006.01) |
| B60B 27/00 | (2006.01) |

(52) U.S. Cl.
CPC ............ B60B 19/003 (2013.01); B60B 19/12 (2013.01); B60B 27/0021 (2013.01)

(58) Field of Classification Search
CPC ... B60B 19/003; B60B 19/12; B60B 27/0021; B60B 19/125; B60K 7/0007; B60K 7/00;

B60K 1/02; B60K 17/043; B60K 2007/003; B60K 2007/0092; B60K 17/046; B60K 2007/0038; F16H 1/28; F16H 1/24;

(Continued)

(56) References Cited

U.S. PATENT DOCUMENTS

| | | | |
|---|---|---|---|
| 8,342,270 B2 * | 1/2013 | Takenaka ............... | B60B 19/003 180/21 |
| 12,247,643 B2 * | 3/2025 | Tsubone .................... | F16H 1/24 |

(Continued)

FOREIGN PATENT DOCUMENTS

| | | |
|---|---|---|
| JP | 2000-052788 A | 2/2000 |
| JP | 2011-068216 A | 4/2011 |

(Continued)

*Primary Examiner* — James A Shriver, II
*Assistant Examiner* — Hilary L Johns
(74) *Attorney, Agent, or Firm* — Keating & Bennett, LLP

(57) ABSTRACT

A wheel assembly includes a wheel portion and a pair of drive assemblies opposing each other with the wheel portion interposed therebetween. One of the pair of drive assemblies includes a first motor and a first deceleration assembly. The other of the pair of drive assemblies includes a second motor and a second deceleration assembly. The first deceleration assembly includes a first input shaft connected to the first output shaft. The first rotation axis and the second rotation axis are parallel to the rotation axis of the wheel portion and disposed outside the wheel portion in the radial direction of the wheel portion. The first output shaft, the first input shaft, the second output shaft, and the second input shaft extend in a direction away from the wheel portion in a direction along the rotation axis.

7 Claims, 15 Drawing Sheets

(58) Field of Classification Search
CPC ......... F16H 1/32; H02K 7/116; B60N 19/003;
B62K 1/00; B60Y 2200/66; B62D 63/02
USPC ...................................................... 180/65.6
See application file for complete search history.

(56) References Cited

U.S. PATENT DOCUMENTS

| | | | | |
|---|---|---|---|---|
| 2010/0096905 A1* | 4/2010 | Takenaka | ................. | B62K 1/00 |
| | | | | 301/5.1 |
| 2021/0300109 A1* | 9/2021 | Tsubone | ............... | B60B 19/125 |
| 2021/0301904 A1* | 9/2021 | Tsubone | ............... | B60B 19/003 |

FOREIGN PATENT DOCUMENTS

| | | | |
|---|---|---|---|
| JP | 5358432 | B2 | 12/2013 |
| JP | 2021-162091 | A | 10/2021 |

* cited by examiner

WHEEL UNIT

CROSS-REFERENCE TO RELATED APPLICATIONS

The present application claims priority under 35 U.S.C. § 119 to Japanese Patent Application No. 2022-157695, filed on Sep. 30, 2022, the entire contents of which are hereby incorporated herein by reference.

FIELD OF THE INVENTION

The present invention relates to a wheel assembly.

BACKGROUND

A conventional electric vehicle includes a drive assembly and a wheel of the vehicle. The drive assembly is disposed adjacent to the wheel. Specifically, the drive assembly includes an electric motor and a reduction gear mechanism. The reduction gear mechanism is interposed between the rotation shaft of the electric motor and the output shaft connected to the wheel.

However, in the wheel assembly such as the conventional electric vehicle, since the wheel portion, the electric motor, and the reduction gear mechanism are arranged in the direction along the rotation axis of the wheel portion, the size of the wheel assembly in the direction along the rotation axis is increased.

SUMMARY

A wheel assembly according to an example embodiment of the present invention includes a wheel portion, a pair of drive assemblies, a first frame, and a second frame. The wheel portion includes a plurality of rollers located on a circumferential line with respect to a rotation axis, the plurality of rollers being rotatable about the circumferential line as an axis, and a first rotary drive and a second rotary drive to transmit power to the plurality of rollers. The pair of drive assemblies supports the wheel portion from two sides on the rotation axis, and are operable to independently rotate the first rotary drive and the second rotary drive. One drive assembly of the pair of drive assemblies and another drive assembly of the pair of drive assemblies oppose each other with the wheel portion interposed between the pair of drive assemblies. The one drive assembly of the pair of drive assemblies includes a first motor including a first output shaft that is rotatable about a first rotation axis, and a first deceleration assembly that is rotatable about the rotation axis of the wheel portion to transmit power to the first rotary drive at an output reduced from a rotation speed of the first motor. The other drive assembly of the pair of drive assemblies includes a second motor including a second output shaft that is rotatable about a second rotation axis, and a second deceleration assembly that is rotatable about the rotation axis of the wheel portion to transmit power to the second rotary drive at an output reduced from a rotation speed of the second motor. The first motor is located in a first region of the first frame, the first deceleration assembly is located in a second region of the first frame spaced away from the first region of the first frame, the second motor is located in a third region of the second frame, and the second deceleration assembly is located in a fourth region of the second frame spaced away from the third region of the second frame. The first deceleration assembly includes a first input shaft connected to the first output shaft. The second deceleration assembly includes a second input shaft connected to the second output shaft. The first rotation axis and the second rotation axis are parallel to the rotation axis of the wheel portion and are located outside the wheel portion in the radial direction of the wheel portion. The first output shaft, the first input shaft, the second output shaft, and the second input shaft extend in a direction away from the wheel portion in a direction along the rotation axis.

The above and other elements, features, steps, characteristics and advantages of the present disclosure will become more apparent from the following detailed description of the example embodiments with reference to the attached drawings.

DETAILED DESCRIPTION

Figure 1:
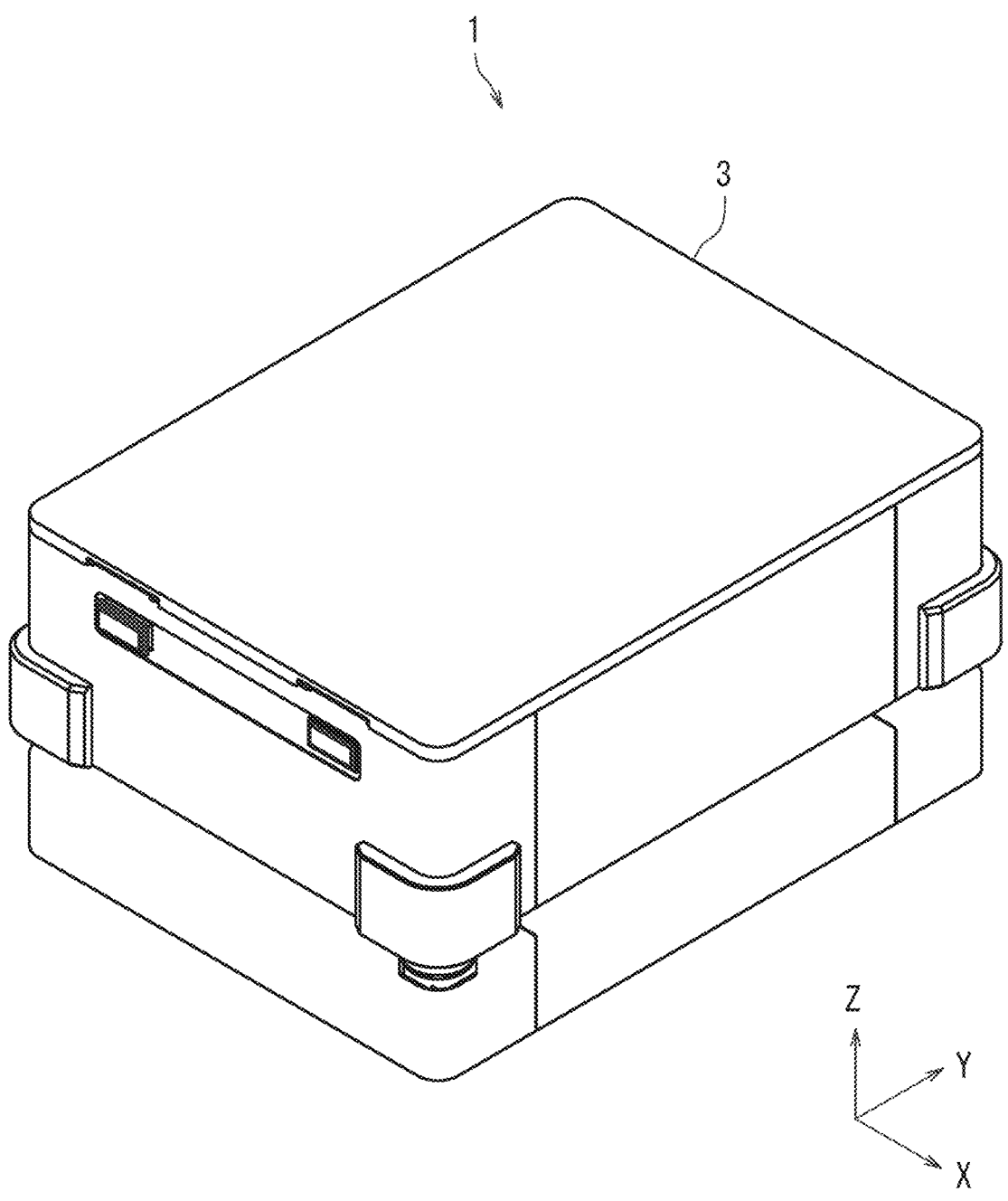
FIG. 1 is a perspective view showing a transport vehicle according to a preferred embodiment of the present invention.

Hereinafter, example embodiments of the present invention will be described with reference to the accompanying drawings. In the drawings, the same or corresponding parts are denoted by the same reference numerals, and the description will not be repeated. In the drawings, the X, Y, and Z axes of the three-dimensional orthogonal coordinate system are described as appropriate for ease of understanding.

In this specification, a direction parallel to a rotation axis AX (for example, FIG. 4) of a wheel assembly is described as an "axial direction AD". That is, the direction along the rotation axis AX is described as the "axial direction AD". The direction orthogonal to the rotation axis AX is described as a "radial direction RD". The "radial direction RD" corresponds to an example of a "radial direction relative to the rotation axis". The direction along an arc about the rotation axis AX is described as a "circumferential direction CD". The "circumferential direction CD" corresponds to an example of a "circumferential direction around the rotation axis". Note that a "parallel direction" includes a substantially parallel direction, and an "orthogonal direction" includes a substantially orthogonal direction. Further, "left and right" indicates left and right when the object is viewed from the radial direction RD.

With reference to FIGS. 1 to 12, a transport vehicle 1 and a wheel assembly DV according to an example embodiment of the present invention will be described. First, the transport vehicle 1 will be described with reference to FIGS. 1 and 2.

Figure 2:
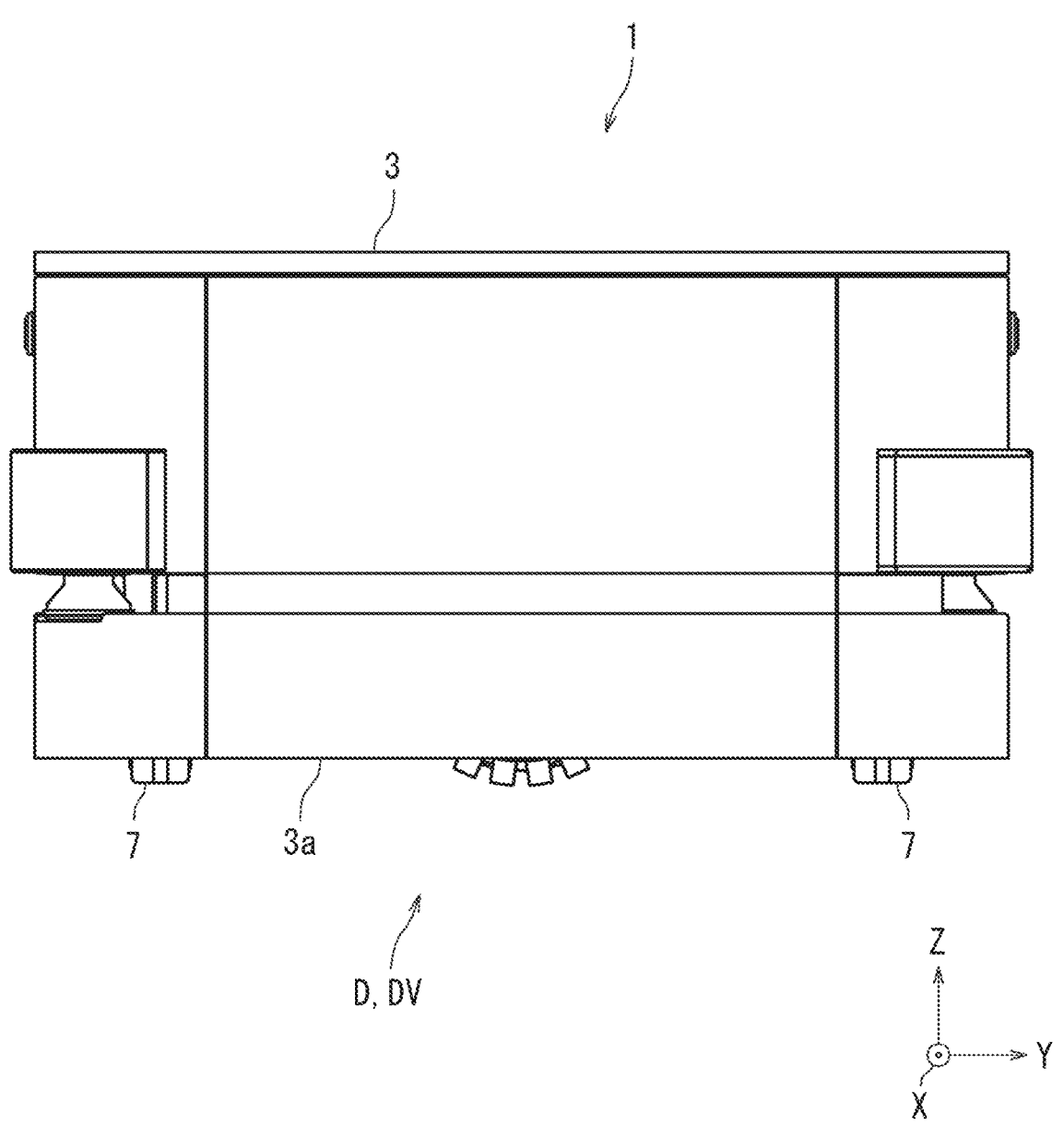
FIG. 2 is a side view showing the transport vehicle.

FIG. 1 is a perspective view illustrating the transport vehicle 1. FIG. 2 is a side view illustrating the transport vehicle 1.

The transport vehicle 1 illustrated in FIGS. 1 and 2 travels on the floor surface or the ground surface. In the present example embodiment, the transport vehicle 1 is an automated guided vehicle (AGV).

As illustrated in FIGS. 1 and 2, the transport vehicle 1 has a vehicle body 3. In the examples of FIGS. 1 and 2, the vehicle body 3 has a substantially rectangular parallelepiped shape. However, the shape of the vehicle body 3 is not particularly limited.

The transport vehicle 1 further includes a plurality of wheel assemblies DV and a plurality of wheels 7. In the present example embodiment, the transport vehicle 1 has a pair of wheel assemblies DV and four wheels 7. The four wheels 7 are respectively disposed at four corners of a bottom portion 3a of the vehicle body 3. Each wheel 7 rotates with the movement of the vehicle body 3. The pair of wheel assemblies DV rotate independently of each other to move the vehicle body 3. The pair of wheel assemblies DV is disposed at the bottom portion 3a of the vehicle body 3 such that the rotation axis AX of one wheel assembly DV of the pair of wheel assemblies DV and the rotation axis AX of the other wheel assembly DV are located on a straight line.

The configurations of the pair of wheel assemblies DV are the same. Therefore, one wheel assembly DV of the pair of wheel assemblies DV will be described below.

Figure 3:
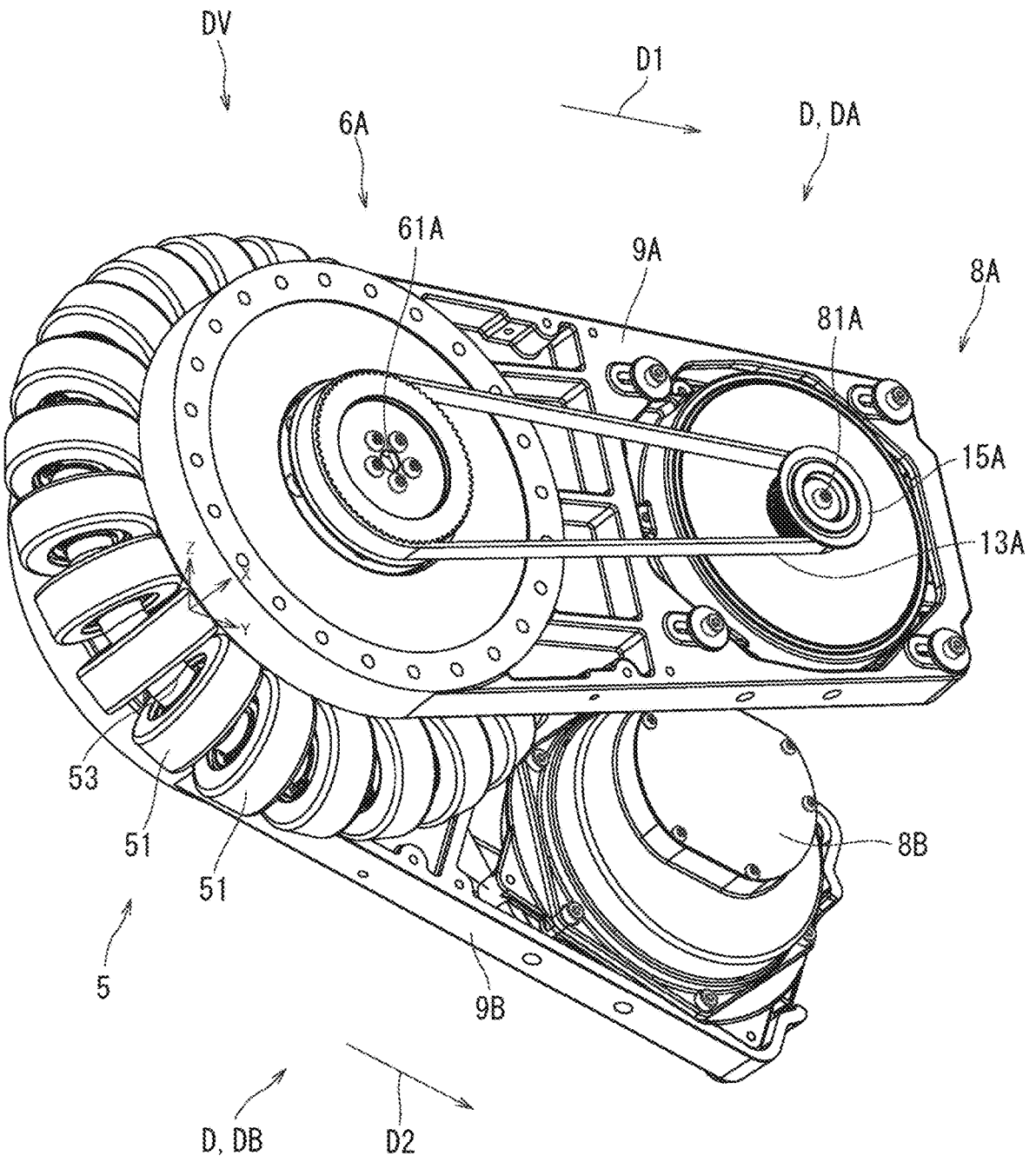
FIG. 3 is a perspective view showing a wheel assembly according to a preferred embodiment of the present invention.
Figure 4:
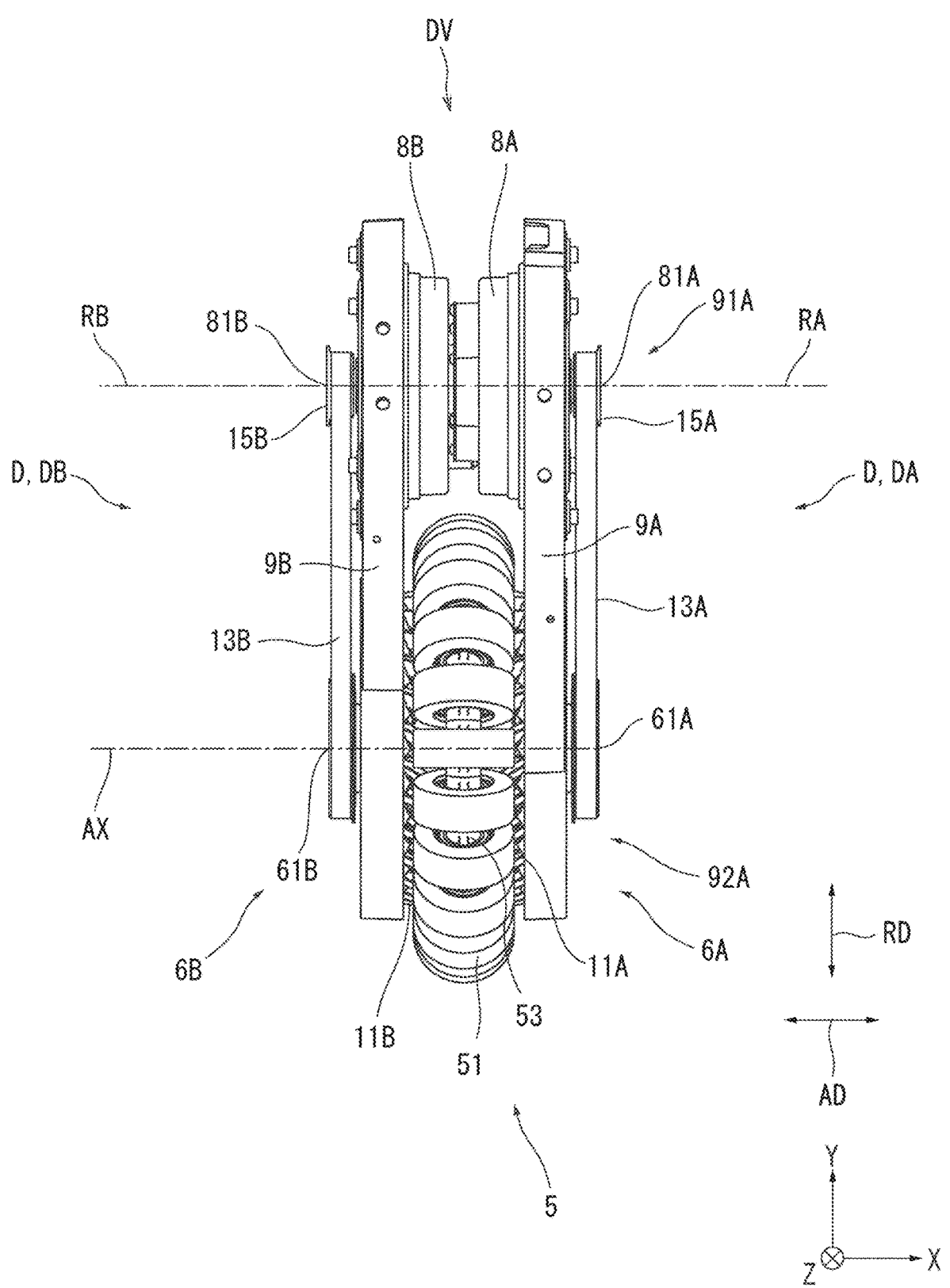
FIG. 4 is a bottom view showing the wheel assembly.

Next, the wheel assembly DV will be described with reference to FIGS. 3 and 4. FIG. 3 is a perspective view showing the wheel assembly DV. FIG. 4 is a bottom view showing the wheel assembly DV. In FIG. 4, the wheel assembly DV is viewed from the floor surface side or the ground surface side.

As illustrated in FIGS. 3 and 4, the wheel assembly DV includes a main wheel 5 and a pair of drive assemblies D. The main wheel 5 is an example of a "wheel portion". One drive assembly of the pair of drive assemblies D is a first drive assembly DA. The other drive assembly of the pair of drive assemblies D is a second drive assembly DB. The pair of drive assemblies D supports the main wheels 5 from both sides on the rotation axis AX. In other words, the first drive assembly DA and the second drive assembly DB face each other with the main wheel 5 interposed therebetween.

The first drive assembly DA and the second drive assembly DB drive the main wheel 5. As a result, the main wheel 5 rotates about the rotation axis AX. Therefore, the rotation axis AX is also the rotation axis of the main wheel 5. The first drive assembly DA comes into contact with the main wheel 5 from one side of the main wheel 5 in the axial direction AD to drive the main wheel 5. The second drive assembly DB comes into contact with the main wheel 5 from the other side of the main wheel 5 in the axial direction AD to drive the main wheel 5.

The first drive assembly DA includes a first rotary drive 11A, a first motor 8A, a first deceleration assembly 6A, a first toothed belt 13A, and a first pulley 15A.

Figure 5:
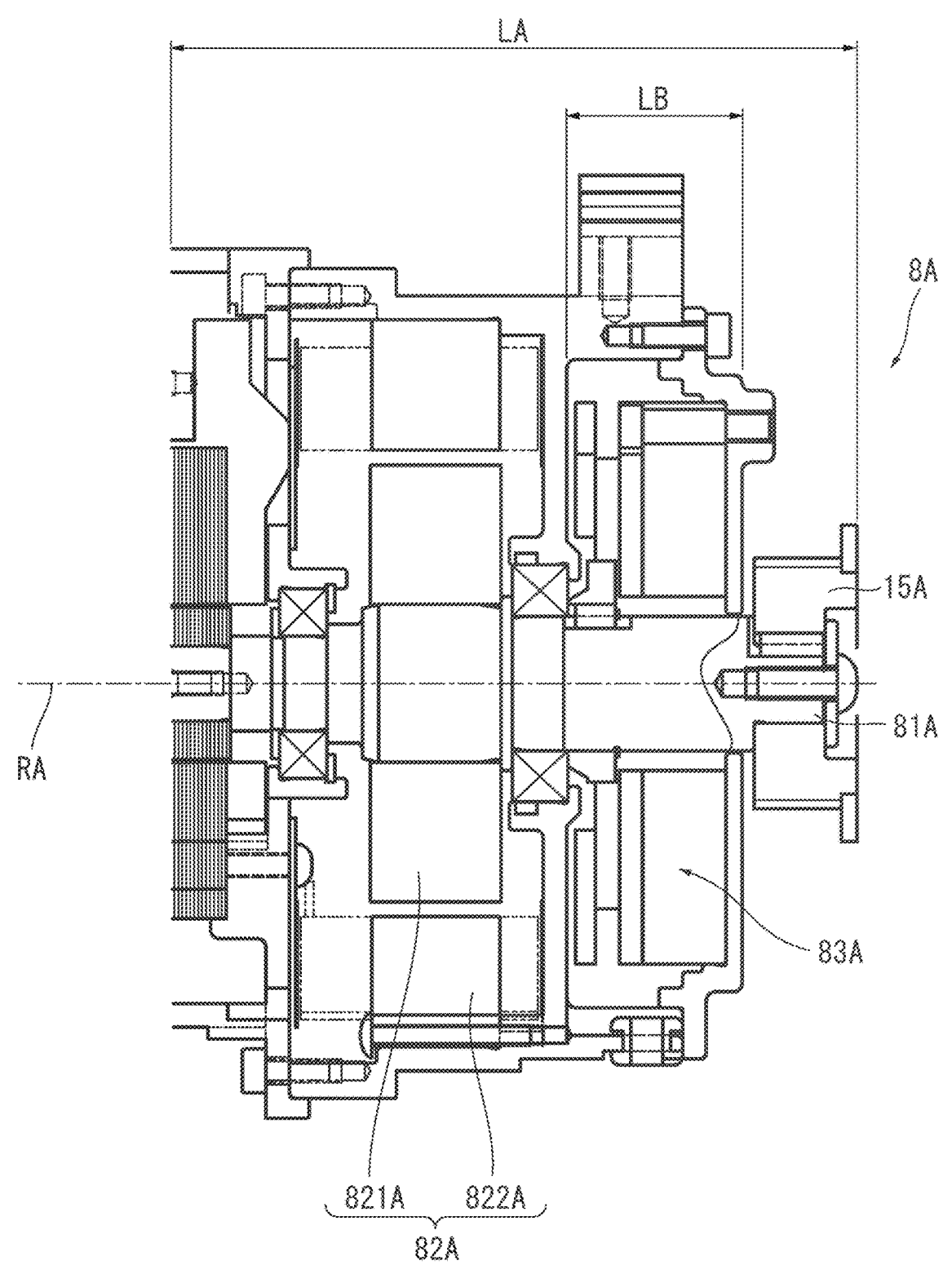
FIG. 5 is a cross-sectional view showing a first motor according to a preferred embodiment of the present invention.

Next, the first motor 8A will be described with reference to FIGS. 3 to 5. FIG. 5 is a cross-sectional view showing the first motor 8A. As illustrated in FIGS. 3 to 5, the first motor 8A includes a first output shaft 81A, a body portion 82A, and a brake 83A. The body portion 82A includes a motor rotor 821A and a motor stator 822A. The first output shaft 81A has a substantially columnar shape. The "columnar" is, for example, "cylindrical". The first output shaft 81A rotates about a first rotation axis RA. The first rotation axis RA is parallel to the rotation axis AX of the main wheel 5 and is disposed outside the main wheel 5 in the radial direction RD of the main wheel 5. In addition, the first output shaft 81A extends from the body portion 82A in a direction away from the main wheel 5 in the axial direction AD along the rotation axis AX. In other words, the first output shaft 81A is disposed on a surface of the body portion 82A on a side away from the main wheel 5. The size of the first motor 8A in the direction along the rotation axis AX of the main wheel 5 is a first distance LA. The size of the brake 83A in the direction along the rotation axis AX of the main wheel 5 is a second distance LB.

Figure 6:
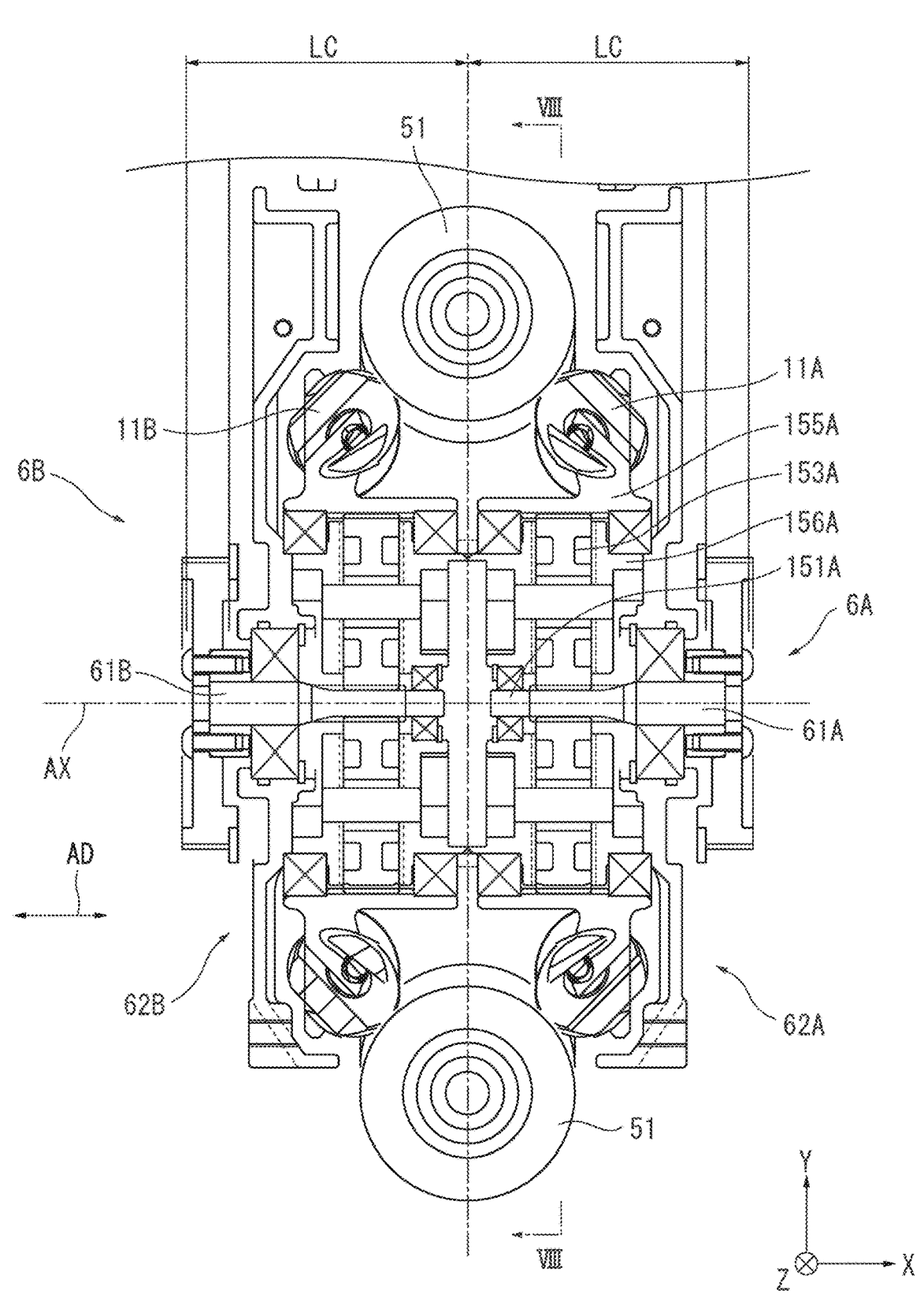
FIG. 6 is a cross-sectional view showing a first deceleration assembly according to a preferred embodiment of the present invention.

Next, the first deceleration assembly 6A will be described with reference to FIGS. 3, 4, and 6. FIG. 6 is a cross-sectional view showing the first deceleration assembly 6A. As illustrated in FIGS. 3, 4, and 6, the first deceleration assembly 6A includes a first input shaft 61A and a body portion 62A. The first input shaft 61A has a substantially columnar shape. The "columnar" is, for example, "cylindrical". The first input shaft 61A is disposed on the rotation axis AX and extends along the axial direction AD. The first deceleration assembly 6A transmits power to the first rotary drive 11A at an output reduced from the rotation speed of the first motor 8A. The first input shaft 61A extends from the body portion 62A in a direction away from the main wheel 5 in the axial direction AD along the rotation axis AX. In other words, the first input shaft 61A is disposed on the surface of the body portion 62A on the side away from the main wheel 5. The first input shaft 61A and the first output shaft 81A extend in parallel and in the same direction. The size of the first deceleration assembly 6A in the direction along the rotation axis AX of the main wheel 5 is a third distance LC. The third distance LC is substantially the same as the difference between the first distance LA and the second distance LB.

Specifically, the first pulley 15A is fixed to the first output shaft 81A of the first motor 8A. Then, the endless first toothed belt 13A is stretched across the first pulley 15A and the first input shaft 61A of the first deceleration assembly 6A in a tensioned state. In other words, the first input shaft 61A and the first output shaft 81A are connected. When the first output shaft 81A of the first motor 8A rotates about the first rotation axis RA, the first pulley 15A rotates, and the first toothed belt 13A goes around. Therefore, the first input shaft 61A rotates about the rotation axis AX.

On the other hand, the second drive assembly DB includes a second rotary drive 11B, a second motor 8B, a second deceleration assembly 6B, a second toothed belt 13B, and a second pulley 15B.

The second motor 8B includes a second output shaft 81B, a main body, and a brake. The body portion includes a motor rotor and a motor stator. The second output shaft 81B has a substantially columnar shape. The "columnar" is, for example, "cylindrical". The second output shaft 81B rotates about a second rotation axis RB. The second rotation axis RB is parallel to the rotation axis AX of the main wheel 5 and is disposed outside the main wheel 5 in the radial direction RD of the main wheel 5. The second output shaft 81B extends from the body portion in a direction away from the main wheel 5 in the axial direction AD along the rotation axis AX. In other words, the second output shaft 81B is disposed on a surface of the body portion on a side away from the main wheel 5. As a result, the second output shaft 81B and the first output shaft 81A extend in directions opposite to each other. The size of second motor 8B in the direction along rotation axis AX of main wheel 5 is a first distance LA. The magnitude of the brake in the direction along the rotation axis AX of the main wheel 5 is a second distance LB.

The second deceleration assembly 6B includes a second input shaft 61B and a body portion 62B. The second input shaft 61B has a substantially columnar shape. The "columnar" is, for example, "cylindrical". The second input shaft 61B is disposed on the rotation axis AX and extends along the axial direction AD. The second deceleration assembly 6B transmits power to the second rotary drive 11B at an output reduced from the rotation speed of the second motor 8B. In addition, the second input shaft 61B extends from the body portion 62B in a direction away from the main wheel 5 in the axial direction AD along the rotation axis AX. In other words, the second input shaft 61B is disposed on the surface of the body portion 62B on the side away from the main wheel 5. As a result, the second input shaft 61B and the first input shaft 61A extend in directions opposite to each other. The second input shaft 61B and the second output shaft 81B extend in parallel and in the same direction. The size of the second deceleration assembly 6B in the direction along the rotation axis AX of the main wheel 5 is a third distance LC. The third distance LC is substantially the same as the difference between the first distance LA and the second distance LB.

The configurations of the second motor 8B, the second deceleration assembly 6B, the second rotary drive 11B, the second toothed belt 13B, and the second pulley 15B have a structure in which the first motor 8A, the first deceleration assembly 6A, the first rotary drive 11A, the first toothed belt 13A, and the first pulley 15A are horizontally reversed, and the description thereof is appropriately omitted.

The first motor 8A is disposed closer to a first direction D1 than the first deceleration assembly 6A. The second motor 8B is disposed closer to a second direction D2 than the second deceleration assembly 6B. The first direction D1 and the second direction D2 intersect with each other. As a result, in the axial direction AD along the rotation axis AX, the distance between the distal end of the first input shaft 61A and the distal end of the second input shaft 61B is substantially the same as the distance between the distal end of the first output shaft 81A and the distal end of the second output shaft 81B.

As illustrated in FIGS. 3 and 4, the main wheel 5 includes a plurality of driven rollers 51 and a core body 53. The core body 53 extends along the circumferential direction CD about the rotation axis AX. The core body 53 has a substantially annular shape. Each of the plurality of driven rollers 51 has a substantially cylindrical shape. The plurality of driven rollers 51 are rotatably supported by the core body 53. Specifically, each of the plurality of driven rollers 51 is rotatable about an axis along a tangential direction of the core body 53 at its own position. Hereinafter, rotation of the driven roller 51 about an axis along the tangential direction of the core body 53 at its own position may be described as "spinning". The plurality of driven rollers 51 are disposed on the core body 53 at intervals along the circumferential direction CD. In other words, the plurality of driven rollers

51 are disposed on the circumferential line with respect to the rotation axis AX and rotate about the circumferential line as an axis.

When the main wheel 5 rotates about the rotation axis AX, each of the plurality of driven rollers 51 is rotationally moved along the circumferential direction CD. Hereinafter, the position of the driven roller 51 in the circumferential direction CD when the driven roller 51 is rotationally moved along the circumferential direction CD may be described as a "rotational movement position". Each of the plurality of driven rollers 51 comes into contact with the floor surface or the ground surface in accordance with the rotational movement position of the driven roller 51. Hereinafter, the contact of the driven roller 51 with the floor surface or the ground surface may be described as "grounding". A roller body of the driven roller 51 is made of rubber, for example.

Figure 7:
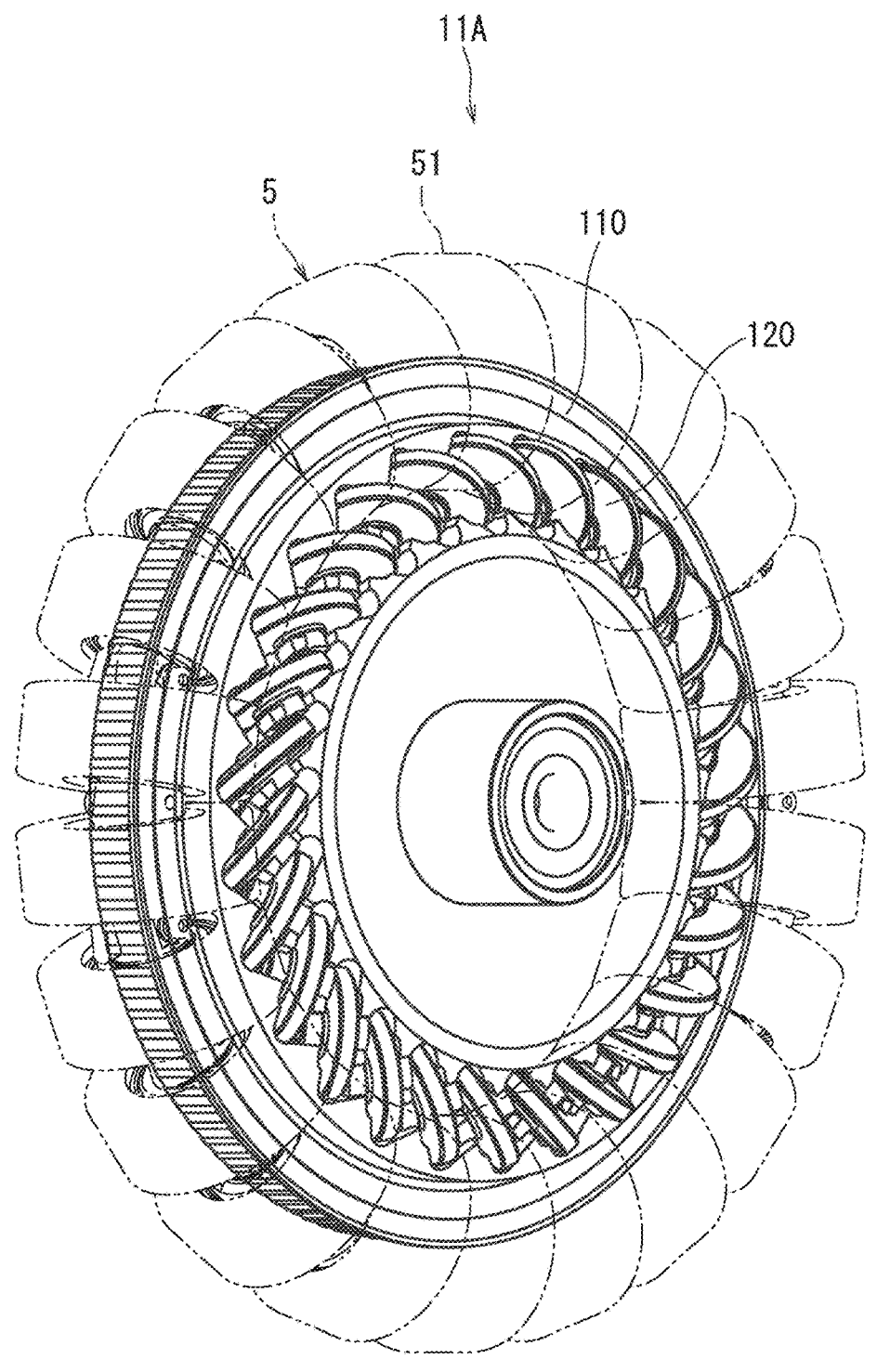
FIG. 7 is a perspective view showing a first rotary drive according to a preferred embodiment of the present invention.

Next, the first rotary drive 11A will be described with reference to FIGS. 4 and 7. FIG. 7 is a perspective view showing the first rotary drive 11A. In FIG. 7, the main wheel 5 is shown by a two-dot chain line in order to make the drawing easier to see.

As illustrated in FIGS. 4 and 7, in the wheel assembly DV, the first rotary drive 11A of the first drive assembly DA has a substantially disk shape. The first rotary drive 11A is made of a highly rigid material such as, for example, metal and hard plastic. The first rotary drive 11A is disposed on one side of the main wheel 5 in the axial direction AD. The first rotary drive 11A is rotatably supported. The first rotary drive 11A is driven by the rotation of the first deceleration assembly 6A to rotate around the rotation axis AX. As a result, the first rotary drive 11A transmits the driving force based on the rotational force to the main wheel 5. That is, the first rotary drive 11A comes into contact with the main wheels 5 from one side of the main wheels 5 in the axial direction AD and transmits the power of the first motor 8A to the main wheels 5.

The first rotary drive 11A and the second rotary drive 11B sandwich the main wheel 5 from the axial direction AD. The first rotary drive 11A and the second rotary drive 11B are disposed symmetrically with respect to the main wheel 5. Further, the first rotary drive 11A and the second rotary drive 11B support the main wheel 5 so as to be rotatable about the rotation axis AX.

Specifically, the first rotary drive 11A includes a plurality of drive rollers 120 and a driving force transmitting member 110. The plurality of drive rollers 120 are arranged in the driving force transmitting member 110. When the driving force transmitting member 110 rotates about the rotation axis AX, each of the plurality of drive rollers 120 is rotationally moved along the circumferential direction CD. Hereinafter, the position of the drive roller 120 in the circumferential direction CD when the drive roller 120 is rotationally moved along the circumferential direction CD may be described as a "rotational movement position".

Each of the plurality of drive rollers 120 comes into contact with any of the plurality of driven rollers 51 in accordance with the rotational movement position of the drive roller 120. Specifically, at least, the drive roller 120 comes into contact with the driven roller 51 positioned at the lowermost part and grounded. In this case, the outer circumferential surface of the drive roller 120 comes into contact with the outer circumferential surface of the driven roller 51. As a result, by the friction between the drive roller 120 and the driven roller 51, the driving force based on the rotation of the driving force transmitting member 110 is transmitted from the drive roller 120 to the driven roller 51. In other words, the plurality of drive rollers 120 transmit the driving force to the main wheel 5. Moreover, in other words, the plurality of drive rollers 120 transmit propulsion force to the main wheel 5.

Specifically, each of the plurality of drive rollers 120 is rotatably disposed around a center axis extending in a direction that is neither orthogonal nor parallel to the rotation direction of the main wheel 5 about the rotation axis AX. That is, the center axis of the plurality of drive rollers 120 is inclined with respect to the rotation direction of the main wheel 5 about the rotation axis AX, and has a twisting relationship with respect to the rotation axis AX.

Subsequently, the control of the movement direction of the main wheel 5 will be described with reference to FIGS. 3 and 4. As shown in FIGS. 3 and 4, the first motor 8A and the second motor 8B independently control the rotation direction and the rotation speed of the first rotary drive 11A and the rotation direction and the rotation speed of the second rotary drive 11B, thereby controlling the movement direction of the main wheel 5.

Specifically, when the first motor 8A and the second motor 8B are driven in the same rotation direction at the same rotation speed, the first rotary drive 11A and the second rotary drive 11B rotate at the same rotation speed in the same rotation direction, and the main wheel 5 rotates about the rotation axis AX. In this case, no rotation speed difference occurs between the first rotary drive 11A and the second rotary drive 11B, and hence the driven roller 51 of the main wheel 5 does not spin, and the main wheel 5 moves forward or backward straight.

On the other hand, when the first motor 8A and the second motor 8B are driven in different rotation directions and/or at different rotation speeds, a rotation speed difference occurs between the first rotary drive 11A and the second rotary drive 11B.

In this case, a component force orthogonal to the circumferential force generated by the rotational force of the first rotary drive 11A acts on the contact surface between the drive roller 120 (FIG. 7) of the first rotary drive 11A and the driven roller 51 of the main wheel 5. In addition, a component force orthogonal to the circumferential force generated by the rotational force of the second rotary drive 11B acts on the contact surface between the drive roller 120 of the second rotary drive 11B and the driven roller 51 of the main wheel 5.

Therefore, the driven roller 51 spins without the main wheel 5 rotating about the rotation axis AX, or the driven roller 51 spins with the main wheel 5 rotating about the rotation axis AX. As a result, the main wheel 5 moves in the left-right direction or the oblique direction.

The first rotary drive 11A and the second rotary drive 11B support the main wheel 5 rotatably about the rotation axis AX by holding the main wheel 5 between the plurality of drive rollers 120 of the first rotary drive 11A and the plurality of drive rollers 120 of the second rotary drive 11B.

As illustrated in FIG. 4, the first rotation axis RA and the second rotation axis RB are disposed outside the main wheel 5. As a result, the first deceleration assembly 6A and the first motor 8A are disposed apart from each other. The second deceleration assembly 6B and the second motor 8B are disposed apart from each other. In other words, the first deceleration assembly 6A and the first motor 8A are not aligned in the direction along the rotation axis AX. The second deceleration assembly 6B and the second motor 8B are not aligned in the direction along the rotation axis AX. Therefore, it is possible to suppress an increase in the size of the wheel assembly DV in the direction along the rotation axis AX.

In addition, the first input shaft 61A and the first output shaft 81A extend in parallel and in the same direction. In addition, the second input shaft 61B and the second output shaft 81B extend in parallel and in the same direction. Further, the second input shaft 61B and the first input shaft 61A extend in directions opposite to each other. The second output shaft 81B and the first output shaft 81A extend in directions opposite to each other. Therefore, the size of the wheel assembly DV in the direction along the rotation axis AX can be set to a distance between the distal end of the first input shaft 61A and the distal end of the second input shaft 61B or a distance between the distal end of the first output shaft 81A and the distal end of the second output shaft 81B.

In the axial direction AD along the rotation axis AX, the distance 2×LC between the distal end of the first input shaft 61A and the distal end of the second input shaft 61B is substantially the same as the distance between the distal end of the first output shaft 81A and the distal end of the second output shaft 81B. Therefore, the size of the wheel assembly DV in the direction along the rotation axis AX can be substantially halved as compared with the case where the first deceleration assembly 6A, the first motor 8A, the second deceleration assembly 6B, and the second motor 8B are arranged in the direction along the rotation axis AX.

Figure 8:
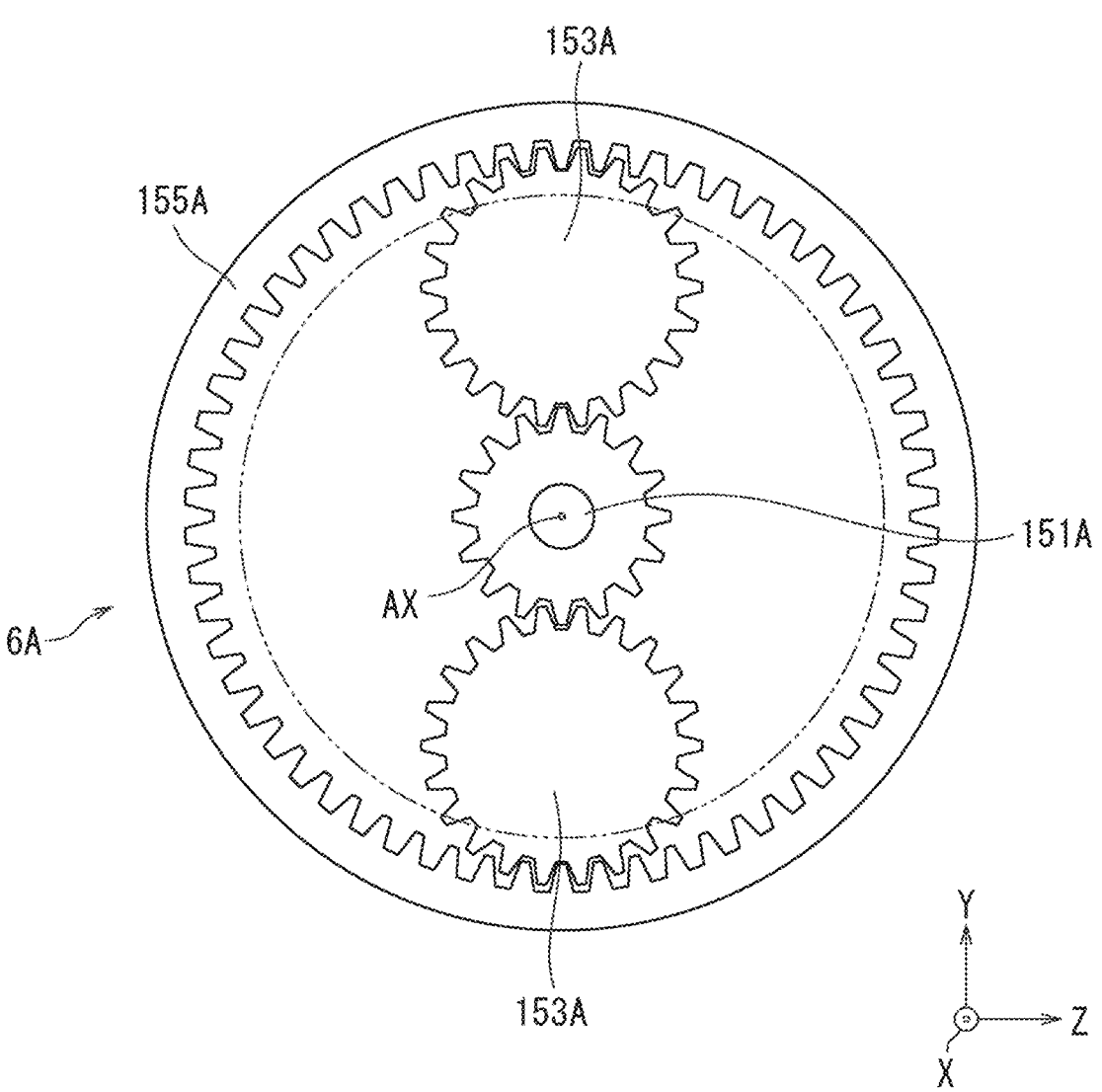
FIG. 8 is a cross-sectional view of the first deceleration assembly taken along line VIII-VIII of FIG. 6.

Next, the first deceleration assembly 6A will be further described with reference to FIGS. 6 and 8. FIG. 8 is a cross-sectional view of the first deceleration assembly 6A taken along line VIII-VIII of FIG. 6.

As illustrated in FIG. 6, the first deceleration assembly 6A includes a first sun gear 151A, a plurality of first planetary gears 153A, a first internal gear 155A, and a first carrier 156A. Specifically, the first deceleration assembly 6A has two first planetary gears 153A. Note that the first deceleration assembly 6A may have three or more first planetary gears 153A.

The first deceleration assembly 6A transmits power by rotating the first sun gear 151A and the two first planetary gears 153A while bringing them into contact with each other. That is, the first deceleration assembly 6A is a so-called planetary gear type decelerator. More specifically, the first deceleration assembly 6A is a planetary gear type decelerator of a star type. Specifically, the external teeth of each of the two first planetary gears 153A mesh with the internal teeth of the first internal gear 155A. The first internal gear 155A constitutes a part of the first rotary drive 11A. Therefore, when the two first planetary gears 153A rotate, the first rotary drive 11A rotates.

The first deceleration assembly 6A converts a rotation motion of a rotation number N1 into a rotation motion of a rotation number N2 lower than the rotation number N1. The rotation number N1 and the rotation number N2 indicate the rotation number of the rotation motion per unit time. In the present example embodiment, the first deceleration assembly 6A reduces the rotation speed of the first sun gear 151A, and rotates the first internal gear 155A at the reduced rotation speed.

Specifically, the first sun gear 151A is disposed inside the first rotary drive 11A in the radial direction RD. The first sun gear 151A rotates about the rotation axis AX. The first sun gear 151A has a substantially cylindrical shape. The first sun gear 151A extends along the axial direction AD. The first sun gear 151A is coupled with the first input shaft 61A in the axial direction AD. Therefore, when the first input shaft 61A rotates at the rotation number N1, the sun gear 151 rotates at the rotation number N1. In the present example embodiment, the first input shaft 61A and the first sun gear 151A are a single member. Note that the first input shaft 61A and the first sun gear 151A may be separate members.

The two first planetary gears 153A are disposed around the first sun gear 151A. In the present example embodiment, the two first planetary gear 153A are disposed at equal intervals along the circumferential direction CD around the first sun gear 151A. The external teeth of each of the two first planetary gears 153A mesh with the external teeth of the first sun gear 151A. Therefore, when the first sun gear 151A rotates, each of the two first planetary gears 153A rotates.

The two first planetary gears 153A are disposed inside the first rotary drive 11A in the radial direction RD. The external teeth of each of the two first planetary gears 153A contact the first internal gear 155A. The first internal gear 155A constitutes a part of the first rotary drive 11A. Therefore, when the two first planetary gears 153A rotate, the first rotary drive 11A rotates.

The first carrier 156A accommodates at least part of the first deceleration assembly 6A. In the present example embodiment, the first carrier 156A accommodates part of the first input shaft 61A, the first sun gear 151A, and the two first planetary gears 153A. The first carrier 156A includes a first body portion 135A and a first shaft insertion portion 139A. The first body portion 135A has a substantially cylindrical shape. The first carrier 156A supports the two first planetary gears 153A so as to spin.

Figure 9:
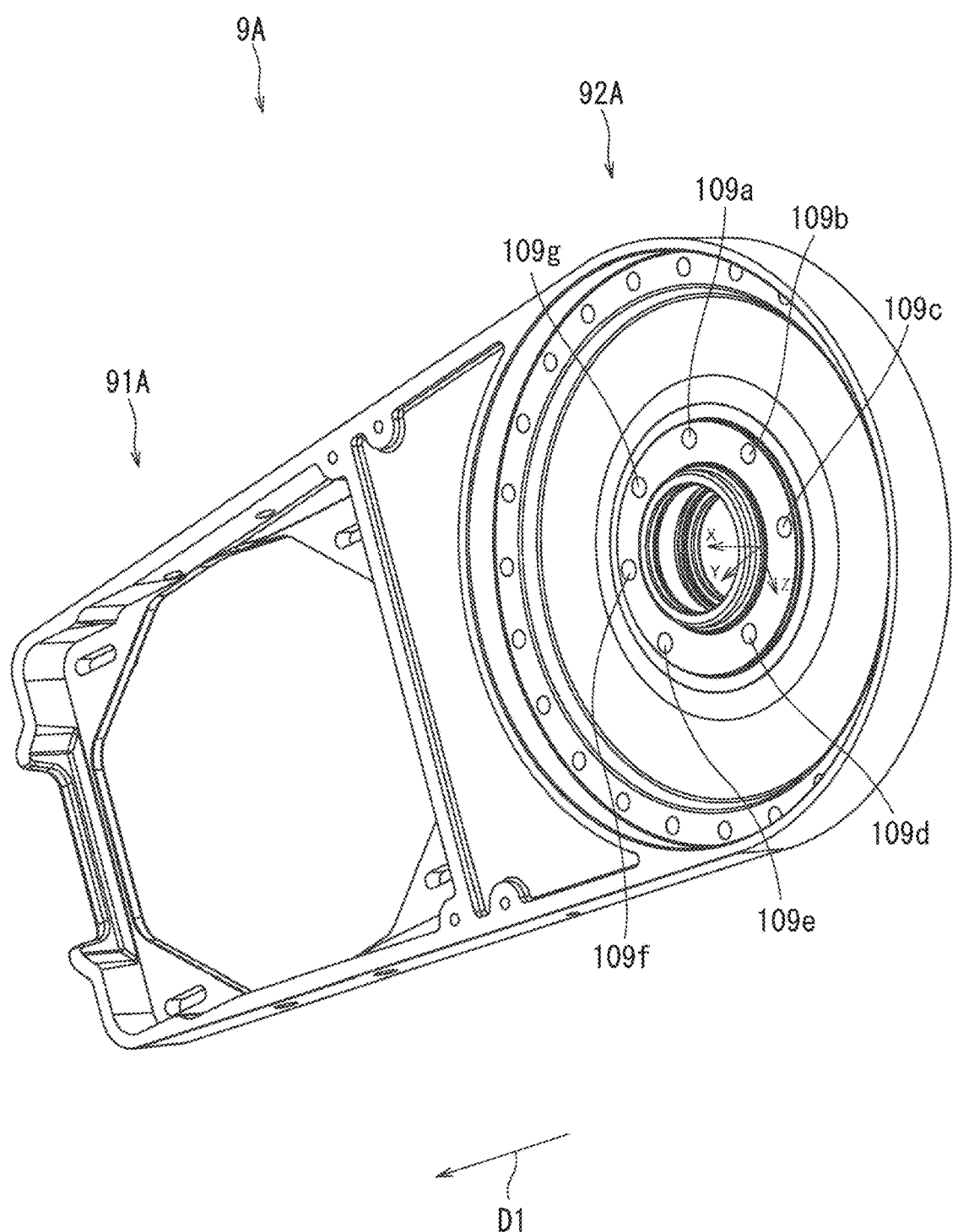
FIG. 9 is a perspective view of a first frame according to a preferred embodiment of the present invention.

Next, a first frame 9A will be further described with reference to FIGS. 3, 4, and 9. FIG. 9 is a perspective view of the first frame 9A. As illustrated in FIGS. 3, 4, and 9, the first drive assembly DA further includes a first frame 9A. The second drive assembly DB further includes a second frame 9B.

The first motor 8A and the first deceleration assembly 6A are disposed in the first frame 9A. The first frame 9A has a substantially flat plate shape. The first motor 8A is disposed in a first region 91A of the first frame 9A. The first deceleration assembly 6A is disposed in a second region 92A of the first frame. The second region 92A is disposed away from the first region 91A of the first frame 9A. Specifically, the first region 91A is disposed closer to the first direction D1 than the second region 92A. Therefore, when the first motor 8A and the first deceleration assembly 6A are disposed in the first frame 9A, the rotation axis AX and the first rotation axis RA are separated from each other in the first direction D1.

In the second frame 9B, the second motor 8B and the second deceleration assembly 6B are disposed. The second frame 9B has a substantially flat plate shape. The second motor 8B is disposed in a third region 91B of the second frame 9B. The second deceleration assembly 6B is disposed in a fourth region 92B of the second frame. The fourth region 92B is disposed away from the third region 91B of the second frame 9B. Specifically, the third region 91B is disposed closer to the second direction D2 than the fourth region 92B. Therefore, when the second motor 8B and the second deceleration assembly 6B are arranged in the second frame 9B, the rotation axis AX and the second rotation axis RB are separated in the second direction D2.

The first drive assembly DA further includes the first frame 9A. The second drive assembly DB further includes a second frame 9B. Therefore, the first motor 8A, the first deceleration assembly 6A, the second motor 8B, and the second deceleration assembly 6B can be easily disposed in the wheel assembly DV.

Figure 10:
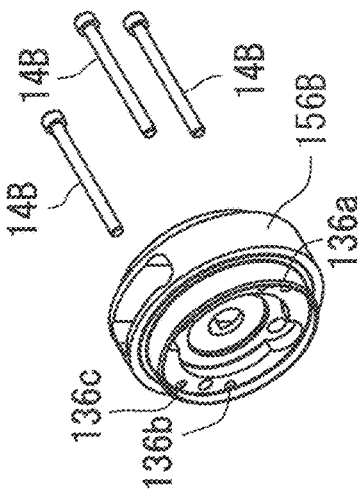
FIG. 10 is an exploded perspective view of the vicinity of a first carrier and a second carrier of the wheel assembly.
Figure 10:
Figure 10:
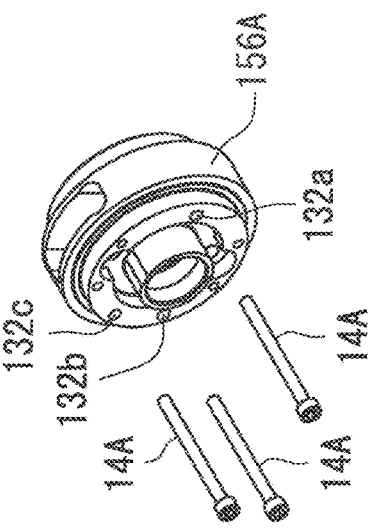

Next, the wheel assembly DV will be further described with reference to FIG. 10. FIG. 10 is an exploded perspective view of the vicinity of the first carrier 156A and the second carrier 156B of the wheel assembly DV. FIG. 10 illustrates the first carrier 156A, the second carrier 156B, a first coupling member 14A, and a second coupling member 14B.

Figure 11:
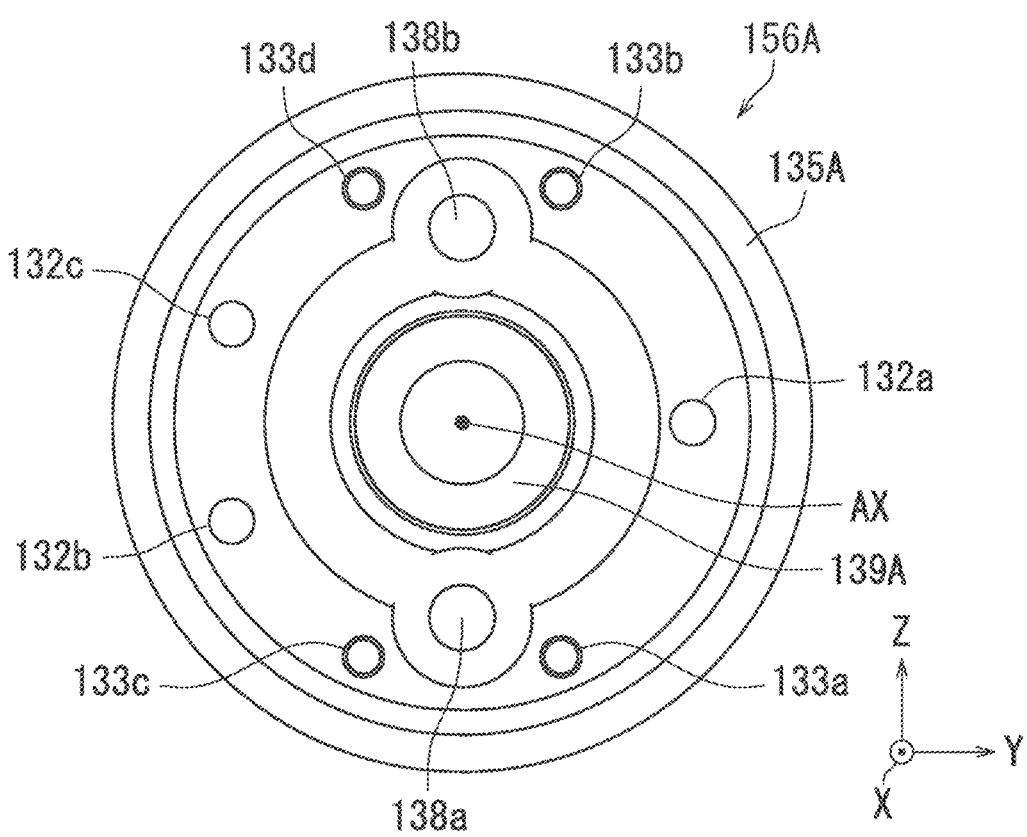
FIG. 11 is a side view showing the first carrier.
Figure 12:
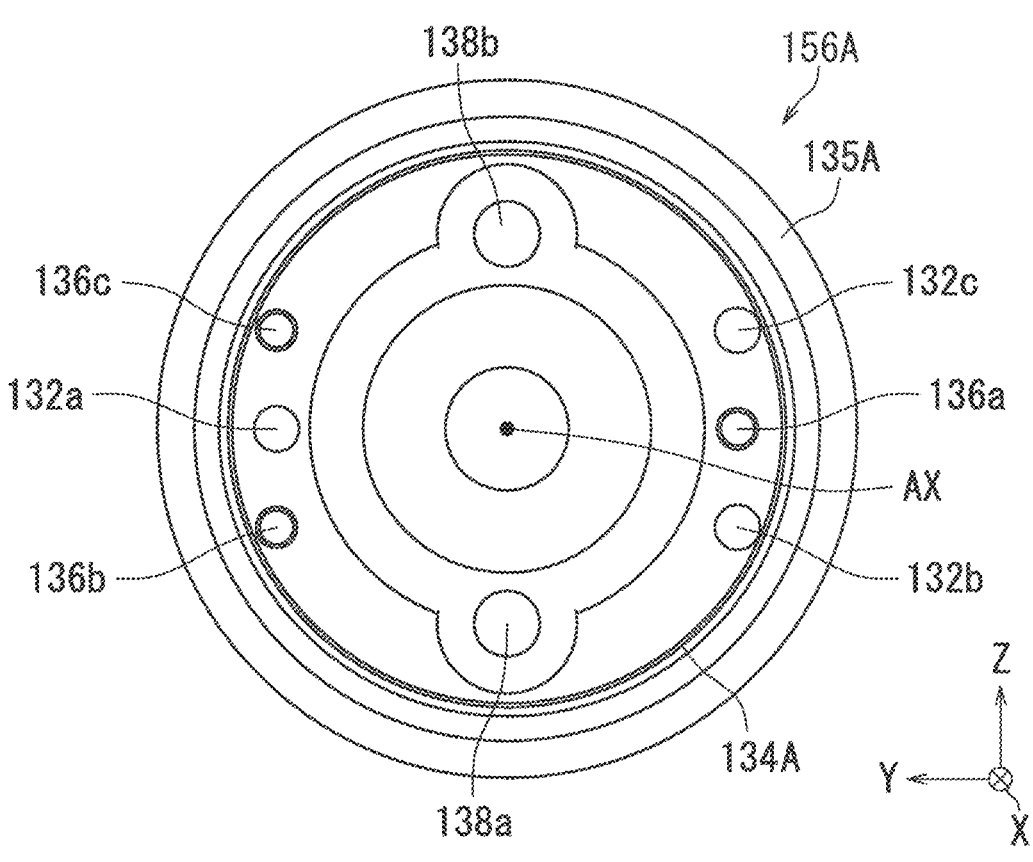
FIG. 12 is a side view showing the first carrier.

The first carrier 156A will be further described with reference to FIGS. 11 and 12. FIGS. 11 and 12 are side views showing the first carrier 156A. Since the first carrier 156A and the second carrier 156B have the same configuration, the description thereof will be omitted as appropriate.

As shown in FIGS. 11 and 12, the first carrier 156A has a first body portion 135A, a first protrusion portion 134A, and a first shaft insertion portion 139A. The first body portion 135A has a substantially cylindrical shape. The first protrusion portion 134A protrudes from the first body portion 135A to the second carrier 156B side. The first output shaft 81A is inserted into the first shaft insertion portion 139A.

Similarly, the first carrier 156A is formed with a plurality of through holes (through hole 132a, through hole 132b, and through hole 132c) and the plurality of screw holes (screw hole 136a, screw hole 136b, and screw hole 136c).

In the present example embodiment, the first carrier 156A is formed with three through holes. In the present description, the through hole 132a, the through hole 132b, and the through hole 132c may be collectively referred to as a through hole 132. The through hole 132 penetrates the first body portion 135A. The first coupling member 14A can be inserted into the through hole 132.

In the present example embodiment, the first carrier 156A is formed with three screw holes. Specifically, the screw hole 136a, the screw hole 136b, and the screw hole 136c are formed in the first body portion 135A. In the present description, the screw hole 136a, the screw hole 136b, and the screw hole 136c may be collectively referred to as a screw hole 136. The screw hole 136 is formed on the side opposite to the side where the first shaft insertion portion 139A is positioned. That is, the screw hole 136 is formed on the side facing the second carrier 156B. The screw hole 136 can be screwed into the second coupling member 14B. The through holes 132 and the screw holes 136 are alternately disposed along the circumferential direction.

Similarly, the second carrier 156B is formed with the plurality of through holes (through hole 132a, through hole 132b, and through hole 132c) and the plurality of screw holes (screw hole 136a, screw hole 136b, and screw hole 136c).

In the present example embodiment, the second carrier 156B is formed with three through holes. In the present description, the through hole 132a, the through hole 132b, and the through hole 132c may be collectively referred to as a through hole 132. The through hole 132 penetrates the second body portion 135B. The second coupling member 14B can be inserted into the through hole 132.

In the present example embodiment, the second carrier 156B is formed with three screw holes. Specifically, the screw hole 136a, the screw hole 136b, and the screw hole 136c are formed in the second body portion 135B. In the present description, the screw hole 136a, the screw hole 136b, and the screw hole 136c may be collectively referred to as a screw hole 136. The screw hole 136 is formed on the side opposite to the side where a second shaft insertion portion 139B is positioned. That is, the screw hole 136 is formed on the side facing the first carrier 156A. The first coupling member 14A can be screwed into the screw hole 136. The through holes 132 and the screw holes 136 are alternately disposed along the circumferential direction. Therefore, the first carrier 156A and the second carrier 156B can be easily fixed.

More specifically, the first body portion 135A is further formed with a fixing hole 133a to a fixing hole 133d, a fixing hole 138a, and a fixing hole 138b. Two first planetary gears 153A are rotatably supported by the fixing hole 138a and the fixing hole 138b.

The fixing hole 138a, the through hole 132c, the screw hole 136a, the through hole 132b, the fixing hole 138b, the screw hole 136b, the through hole 132a, and the screw hole 136c are disposed along the circumferential direction CD. As a result, the first planetary gear 153A (second planetary gear 153B), the first coupling member 14A, the second coupling member 14B, the first coupling member 14A, the first planetary gear 153A (second planetary gear 153B), the second coupling member 14B, the first coupling member 14A, and the second coupling member 14B are disposed along the circumferential direction CD. In other words, when viewed from the direction along the rotation axis AX, the three first coupling portions 14A and the three second coupling portions 14B are disposed at positions not overlapping the two first planetary gears 153A (the two second planetary gears 153B). Therefore, it is possible to further suppress an increase in the size of the wheel assembly DV in the direction along the rotation axis AX.

Similarly, the second body portion 135B is further formed with a fixing hole 133a to a fixing hole 133d, a fixing hole 138a, and a fixing hole 138b. The two second planetary gears 153B are rotatably supported by the fixing hole 138a and the fixing hole 138b.

A plurality of screw holes 109 are formed in the first frame 9A. In the present example embodiment, seven screw holes 109a, 109b, 109c, 109d, 109e, 109f, and 109g are formed in the first frame 9A. For example, a screw can be inserted into each of the seven screw holes 109a, 109b, 109c, 109d, 109e, 109f, and 109g. When the first frame 9A is disposed in the wheel assembly DV, the first direction D1 and the rotation axis AX are orthogonal to each other.

The seven screw holes 109a, 109b, 109c, 109d, 109e, 109f, and 109g are disposed at point-symmetrical positions about the rotation axis AX. The first frame 9A and the first carrier 156A are fixed by inserting screws into four screw holes selected from among the seven screw holes 109a, 109b, 109c, 109d, 109e, 109f, and 109g and the fixing hole 133a to the fixing hole 133d.

A plurality of screw holes 109 are formed in the second frame 9B. In the present example embodiment, seven screw holes 109a, 109b, 109c, 109d, 109e, 109f, and 109g are formed in the second frame 9B. For example, a screw can be inserted into each of the seven screw holes 109a, 109b, 109c, 109d, 109e, 109f, and 109g. When the second frame 9B is disposed in the wheel assembly DV, the second direction D2 and the rotation axis AX are orthogonal to each other.

The seven screw holes 109a, 109b, 109c, 109d, 109e, 109f, and 109g are disposed at point-symmetrical positions about the rotation axis AX. The second frame 9B and the second carrier 156B are fixed by inserting screws into four screw holes selected from among the seven screw holes 109a, 109b, 109c, 109d, 109e, 109f, and 109g and the fixing hole 133a to fixing hole 133d.

Figure 13:
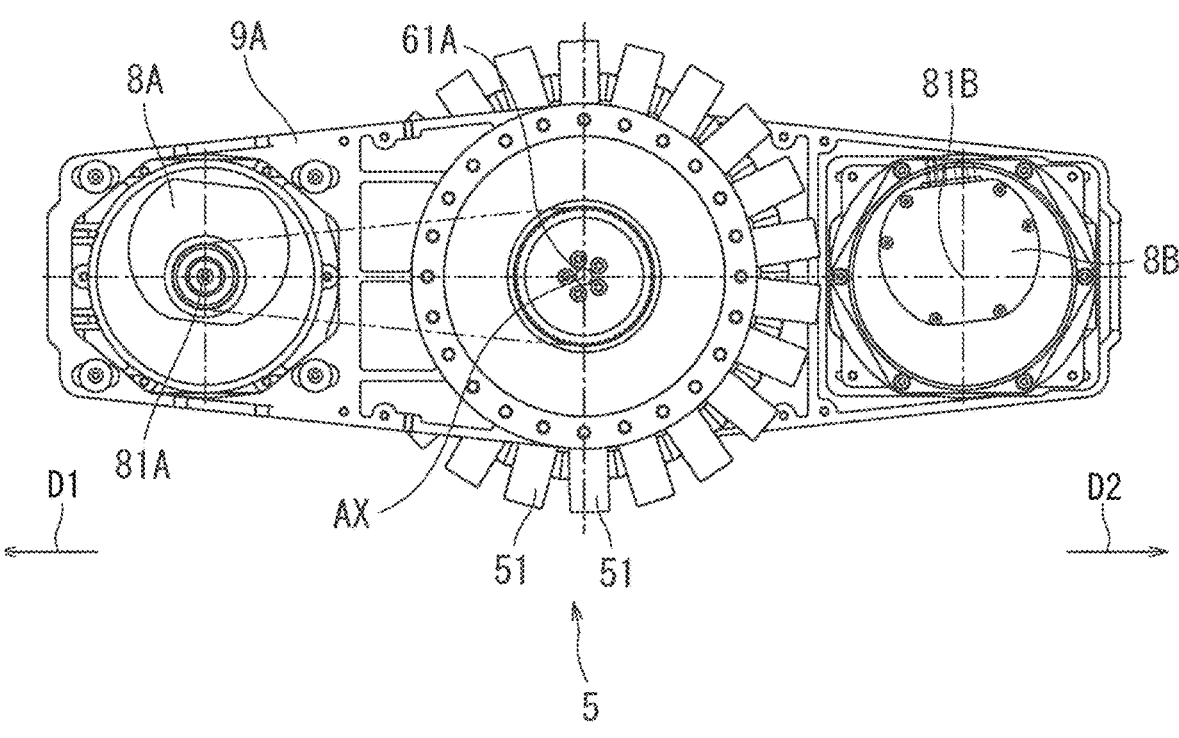
FIG. 13 is a side view showing an example of the wheel assembly.
Figure 14:
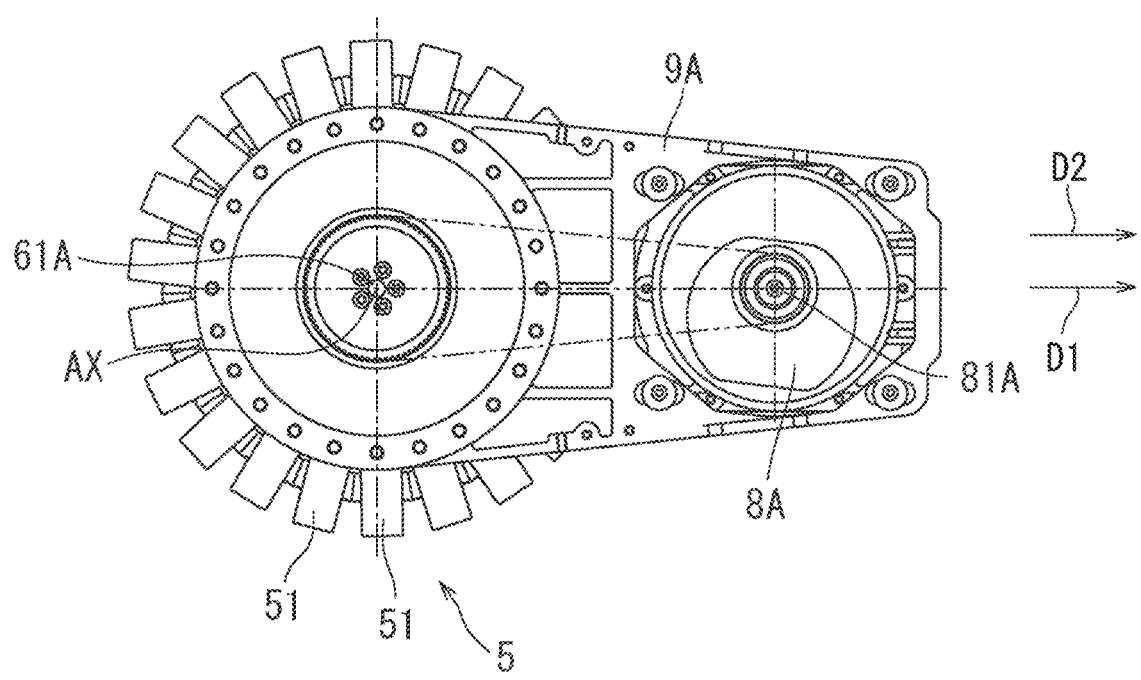
FIG. 14 is a side view showing another example of the wheel assembly.
Figure 15:
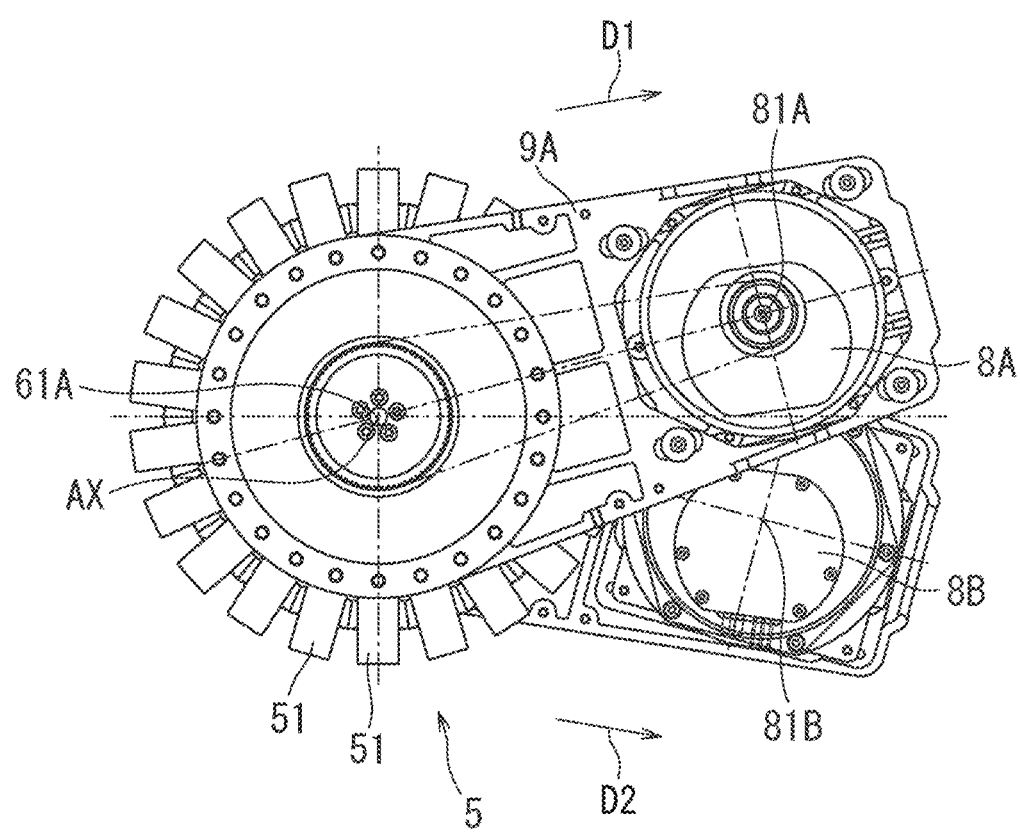
FIG. 15 is a side view showing still another example of the wheel assembly.

Next, the wheel assembly DV will be further described with reference to FIGS. 13 to 15. FIG. 13 is a side view showing an example of the wheel assembly DV. FIG. 14 is a side view showing another example of the wheel assembly DV. FIG. 15 is a side view showing still another example of the wheel assembly DV.

As illustrated in FIG. 13, the first direction D1 is different from a direction opposite to the second direction D2. Specifically, the angle between the first direction D1 and the second direction D2 is an acute angle. As a result, the first motor 8A and the second motor 8B are not aligned in the first direction D1 or the second direction D2. Therefore, it is possible to suppress an increase in the size of the wheel assembly DV in the first direction D1 or the second direction D2. In addition, it is possible to suppress an increase in the size of the wheel assembly DV in the direction along the rotation axis AX. For example, in the axial direction AD along the rotation axis AX, the distance 2×LC between the distal end of the first input shaft 61A and the distal end of the second input shaft 61B is substantially the same as the distance between the distal end of the first output shaft 81A and the distal end of the second output shaft 81B.

As illustrated in FIG. 14, the first direction D1 and the second direction D2 are the same direction. As a result, it is possible to suppress an increase in the size of the wheel assembly DV in the first direction D1 or the second direction D2. In FIG. 14, the first motor 8A and the second motor 8B have no brake. As a result, in the axial direction AD along the rotation axis AX, the distance 2×LC between the distal end of the first input shaft 61A and the distal end of the second input shaft 61B is substantially the same as the distance between the distal end of the first output shaft 81A and the distal end of the second output shaft 81B.

As illustrated in FIG. 15, the first direction D1 and the second direction D2 are opposite directions. As a result, the first motor 8A and the second motor 8B are arranged in the first direction D1 and the second direction D2. Therefore, it is possible to suppress an increase in the size of the wheel assembly DV in the first direction D1 and the direction orthogonal to the rotation axis AX. In addition, it is possible to suppress an increase in the size of the wheel assembly DV in the direction along the rotation axis AX. For example, the size of the wheel assembly DV in the direction along the rotation axis AX is a distance 2×LC between the distal end of the first input shaft 61A and the distal end of the second input shaft 61B.

The example embodiments of the present invention have been described above with reference to the drawings (FIGS. 1 to 15). It should be noted that the present invention is not limited to the above-described example embodiments and is implementable in various forms within a range not departing from the scope of the present invention. For easy understanding, the drawings schematically illustrate each component as the subject, and the thickness, length, number, and the like of each illustrated constituent element are different from actual ones for convenience of drawing. Additionally, the material, shape, dimension, and the like of each component illustrated in the above-described example embodiments are mere examples and are not particularly limited, and various modifications can be made without substantially departing from the effects of the present invention.

(1) In the present example embodiment described with reference to FIGS. 1 to 15, the wheel assembly DV is applied to the transport vehicle 1. However, the application of the wheel assembly DV is not limited to the transport vehicle 1, and the wheel assembly DV can be applied to any moving body moving on the floor surface or the ground surface. The moving body is, for example, a unicycle, a two-wheeler, a three-wheeler, or a four-wheeler. In addition, the moving body may have one wheel assembly DV, or may have two or more wheel assemblies DV.

(2) In the present example embodiment described with reference to FIGS. 1 to 15, the deceleration assembly is a planetary gear type decelerator. However, the present invention is not limited thereto. The deceleration assembly may be a worm decelerator, a gear decelerator, a bevel gear decelerator, or a traction decelerator.

The present technology can also adopt the following configurations.

(1) A wheel assembly including a wheel portion including a plurality of rollers arranged on a circumferential line with respect to a rotation axis, the plurality of rollers rotating about the circumferential line as an axis, and a first rotary drive and a second rotary drive that transmit power to the plurality of rollers, a pair of drive assemblies that support the wheel portion from two sides on the rotation axis and independently rotate the first rotary drive and the second rotary drive, a first frame, and a second frame, in which one drive assembly of the pair of drive assemblies and another drive assembly of the pair of drive assemblies oppose each other with the wheel portion interposed between the pair of drive assemblies, the one drive assembly of the pair of drive assemblies includes a first motor having a first output shaft that rotates about a first rotation axis, and a first deceleration assembly that rotates about the rotation axis of the wheel portion and transmit power to the first rotary drive at an output reduced from a rotation speed of the first motor, the other drive assembly of the pair of drive assemblies includes a second motor including a second output shaft that rotates about a second rotation axis, and a second deceleration assembly that rotates about the rotation axis of the wheel portion and transmits power to the second rotary drive at an output reduced from a rotation speed of the second motor, the first motor is located in a first region of the first frame, the first deceleration assembly is located in a second region of the first frame spaced away from the first region of the first frame, the second motor is located in a third region of the second frame, the second deceleration assembly is located in a fourth region of the second frame spaced away from the third region of the second frame, the first deceleration assembly includes a first input shaft connected to the first output shaft, the second deceleration assembly includes a second input shaft connected to the second output shaft, the first rotation axis and the second rotation axis are parallel to the rotation axis of the wheel portion and located outside the wheel portion in a radial direction of the wheel portion, and the first output shaft, the first input shaft, the second output shaft, and the second input shaft extend in a direction away from the wheel portion in a direction along the rotation axis.

(2) The wheel assembly according to (1), in which the first deceleration assembly further includes a first carrier, the second deceleration assembly further includes a second carrier, the first carrier and the second carrier are coupled by three first coupling portions and three second coupling portions, and each of the first coupling portions and each of the second coupling portions are alternately arranged along a circumferential direction.

(3) The wheel assembly according to (1) or (2), in which the first deceleration assembly further includes two first planetary gears, and the second deceleration assembly further includes two second planetary gears.

(4) The wheel assembly according to (1) or (2), in which the three first coupling portions and the three second coupling portions are located at positions not overlapping the two first planetary gears and the two second planetary gears when viewed from a direction along the rotation axis.

(5) The wheel assembly according to any one of (1) to (4), in which the rotation axis and the first rotation axis are separated from each other in a first direction, the rotation axis and the second rotation axis are separated from each other in a second direction, the first direction and the second direction are orthogonal to the rotation axis, the second region of the first frame or the fourth region of the second frame is rotatable about the rotation axis, and the first frame is fixed in a stationary state with respect to the second frame.

(6) The wheel assembly according to (5), in which the first direction is different from a direction opposite to the second direction.

(7) The wheel assembly according to (5), in which the first direction and the second direction are opposite directions.

Example embodiments of the present invention can be applied to, for example, a wheel assembly.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A wheel assembly comprising:
a wheel portion including a plurality of rollers located on a circumferential line with respect to a rotation axis, the plurality of rollers rotating about the circumferential line as an axis, and a first rotary drive and a second rotary drive to transmit power to the plurality of rollers;
a pair of drive assemblies that support the wheel portion from two sides on the rotation axis and are operable to independently rotate the first rotary drive and the second rotary drive;
a first frame; and
a second frame; wherein
one drive assembly of the pair of drive assemblies and another drive assembly of the pair of drive assemblies oppose each other with the wheel portion interposed between the pair of drive assemblies;
the one drive assembly of the pair of drive assemblies includes:
a first motor including a first output shaft that is rotatable about a first rotation axis; and
a first deceleration assembly that is rotatable about the rotation axis of the wheel portion to transmit power to the first rotary drive at an output reduced from a rotation speed of the first motor;
the other drive assembly of the pair of drive assemblies includes:
a second motor including a second output shaft that is rotatable about a second rotation axis; and
a second deceleration assembly that is rotatable about the rotation axis of the wheel portion to transmit power to the second rotary drive at an output reduced from a rotation speed of the second motor;

the first motor is located in a first region of the first frame;

the first deceleration assembly is located in a second region of the first frame spaced away from the first region of the first frame;

the second motor is located in a third region of the second frame;

the second deceleration assembly is located in a fourth region of the second frame spaced away from the third region of the second frame;

the first deceleration assembly includes a first input shaft connected to the first output shaft;

the second deceleration assembly includes a second input shaft connected to the second output shaft;

the first rotation axis and the second rotation axis are parallel to the rotation axis of the wheel portion and located outside the wheel portion in a radial direction of the wheel portion; and the first output shaft, the first input shaft, the second output shaft, and the second input shaft extend in a direction away from the wheel portion in a direction along the rotation axis.

2. The wheel assembly according to claim 1, wherein the first deceleration assembly further includes a first carrier;

the second deceleration assembly further includes a second carrier;

the first carrier and the second carrier are coupled by three first coupling portions and three second coupling portions; and each of the first coupling portions and each of the second coupling portions are alternately arranged along a circumferential direction.

3. The wheel assembly according to claim 2, wherein the first deceleration assembly further includes two first planetary gears; and the second deceleration assembly further includes two second planetary gears.

4. The wheel assembly according to claim 3, wherein the three first coupling portions and the three second coupling portions are located at positions not overlapping the two first planetary gears and the two second planetary gears when viewed from a direction along the rotation axis.

5. The wheel assembly according to claim 1, wherein the rotation axis and the first rotation axis are separated from each other in a first direction;

the rotation axis and the second rotation axis are separated from each other in a second direction;

the first direction and the second direction are orthogonal to the rotation axis;

the second region of the first frame or the fourth region of the second frame is rotatable about the rotation axis; and the first frame is fixed in a stationary state with respect to the second frame.

6. The wheel assembly according to claim 5, wherein the first direction is different from a direction opposite to the second direction.

7. The wheel assembly according to claim 5, wherein the first direction and the second direction are opposite directions.

* * * * *